(12) United States Patent
Fang et al.

(10) Patent No.: US 9,137,699 B2
(45) Date of Patent: Sep. 15, 2015

(54) ANTENNA DEVICE AND CONTROL METHOD THEREOF

(71) Applicant: Wistron NeWeb Corp., Hsinchu (TW)

(72) Inventors: Chen-Hung Fang, Hsinchu (TW);
Chih-Wei Huang, Hsinchu (TW);
Wen-Jiun Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 7 days.

(21) Appl. No.: 14/099,931

(22) Filed: Dec. 7, 2013

(65) Prior Publication Data
US 2014/0162565 A1 Jun. 12, 2014

(30) Foreign Application Priority Data
Dec. 7, 2012 (TW) .............................. 101146113 A

(51) Int. Cl.
*H04B 17/00* (2015.01)
*H04W 24/10* (2009.01)
(52) U.S. Cl.
CPC ..................................... *H04W 24/10* (2013.01)
(58) Field of Classification Search
CPC ......................................................... H04B 7/04
USPC .................. 455/25, 63.4, 67.11, 562.1, 575.7
See application file for complete search history.

(56) References Cited

U.S. PATENT DOCUMENTS

| 6,377,204 | B1* | 4/2002 | Wurman et al. ................. 342/59 |
| 6,456,610 | B1* | 9/2002 | Briley ........................... 370/337 |
| 2012/0086596 | A1 | 4/2012 | Insanic et al. |

OTHER PUBLICATIONS

Office Action issued in corresponding Taiwan application (dated May 5, 2015).

* cited by examiner

*Primary Examiner* — Tuan H Nguyen
(74) *Attorney, Agent, or Firm* — McClure, Qualey & Rodack, LLP

(57) ABSTRACT

A method for controlling an antenna is provided. The antenna can rotate in a signal area and point to one of a plurality of scanning sectors of the signal area. The method includes: (a) measuring an environment identification data in an initial scanning sector of the scanning sectors and determining if the environment identification data matches an operation identification data; (b) if the environment identification data matches the operation identification data, measuring an environment evaluation signal, wherein the environment evaluation signal corresponds to the environment identification data; (c) comparing the environment evaluation signal with an operation evaluation signal, wherein the operation identification data corresponds to the operation evaluation signal; and (d) maintaining the antenna in the initial scanning sector and recording the environment evaluation signal if the environment evaluation signal is larger than or equal to the operation evaluation signal.

10 Claims, 4 Drawing Sheets

ANTENNA DEVICE AND CONTROL METHOD THEREOF

BACKGROUND OF THE INVENTION

1. Field of the Invention

The present invention generally relates to an antenna device and a control method thereof; particularly, the present invention relates to an antenna device and a control method thereof which can decrease driving frequency and increase the service life.

2. Description of the Prior Art

In the present, network prevails everywhere; wireless network, especially, changes the lifestyle of people and expands the transmission range of information. Generally, the cable network can connect with the conventional wireless access point (AP) to transmit the wireless network signal, and the electronic device receives the wireless network signal.

In practical applications, the conventional wireless AP has an antenna and utilizes the antenna to transmit the wireless network signal. It is noted that the types of the conventional wireless AP include a manual-antenna wireless AP, a rotatable-antenna wireless AP, or other antenna wireless APs. For instance, the rotatable-antenna wireless AP utilizes the driver to rotate the antenna and further to determine the better orientation of the antenna to transmit/receive the signals to/from the device of the user.

However, because the conventional wireless AP detects the position of the signals is very often, the antenna is frequently driven to be rotated, resulting high usage rate of the driver and the antenna. In other words, in order to obtain the optimum antenna pointing direction at which the strongest signal is obtained, the AP lacks a judgment mechanism to rotate or to stop rotating the antenna and has to frequently rotate the antenna. In practical applications, frequently-rotating the antenna not only severely decreases the service life of the antenna and the driver but also fails to provide a stable measuring quality.

For the above reasons, it is desired to design an antenna device which can decrease the frequency of rotating the antenna and increase the operation quality.

SUMMARY OF THE INVENTION

In view of prior arts, the present invention provides an antenna device and a control method thereof which have stable operation efficiency and can simplify the operation process.

It is an object of the present invention to provide a control method which compares the parameters to decrease the frequency of rotating the antenna.

It is another object of the present invention to provide an antenna device which has a signal database to improve the measuring efficiency.

It is another object of the present invention to provide a control method which can judge the amplitude of the signals to increase the service life of the device.

An embodiment of the present invention provides a method for controlling an antenna, the antenna capable of rotating in a signal area and pointing to one of a plurality of scanning sectors of the signal area, the method including: (a) measuring an environment identification data in an initial scanning sector of the scanning sectors and determining if the environment identification data matches an operation identification data; (b) if the environment identification data matches the operation identification data, measuring an environment evaluation signal, wherein the environment evaluation signal corresponds to the environment identification data; (c) comparing the environment evaluation signal with an operation evaluation signal, wherein the operation identification data corresponds to the operation evaluation signal; and (d) maintaining the antenna in the initial scanning sector and recording the environment evaluation signal if the environment evaluation signal is larger than or equal to the operation evaluation signal.

Another embodiment of the present invention provides an antenna device disposed in a signal area, and the antenna device includes a signal database, an antenna, and a comparison. In an embodiment, the signal database stores an operation evaluation data and an operation evaluation signal, wherein the operation identification data corresponds to the operation evaluation signal. The antenna is connected with the signal database, wherein the antenna is located in one of a plurality of scanning sectors and measures an environment identification data and an environment evaluation signal in an initial scanning sector of the scanning sectors, and the environment identification data corresponds to the environment evaluation signal. In addition, the comparison module is connected with the signal database, the comparison module determines if the environment identification data matches the operation identification data, wherein if the environment identification data matches the operation identification data, the comparison module compares the operation evaluation signal with the environment evaluation signal; if the environment evaluation signal is larger than or equal to the operation evaluation signal, the antenna is maintained in the initial scanning sector and the signal database records the environment evaluation signal.

Compared to the prior arts, the antenna device and the control method of the embodiments of the present invention can determine whether to rotate the antenna by comparing the environment evaluation signal and the operation evaluation signal so as to decrease the frequency of rotating the antenna. In practical applications, the antenna device and the control method thereof maintain the antenna in the initial scanning sector if the environment evaluation signal is larger than or equal to the operation evaluation signal. In other words, the antenna device and the control method thereof utilize a mechanism of driving judgment so as to increase the service life.

The detailed descriptions and the drawings thereof below provide further understanding about the advantage and the spirit of the present invention.

DETAILED DESCRIPTION OF THE PREFERRED EMBODIMENT

According to an embodiment of the present invention, the control method can improve the operation efficiency of an antenna device. In the embodiment, the method is used for controlling an antenna of the antenna device, wherein the antenna rotates in a signal area and points to one of a plurality of scanning sectors of the signal area. It is noted that the signal area includes a 360 degrees full-angular area of a plane, and the antenna can rotate in the signal area and points to any one of the scanning sectors. In other embodiments, the signal area can be a plurality of planes or an angular area having an angle less than 360 degrees, wherein the angle of the angular area can be 90 degrees, 180 degrees, or 270 degrees, but not limited to thereto.

Figure 1:
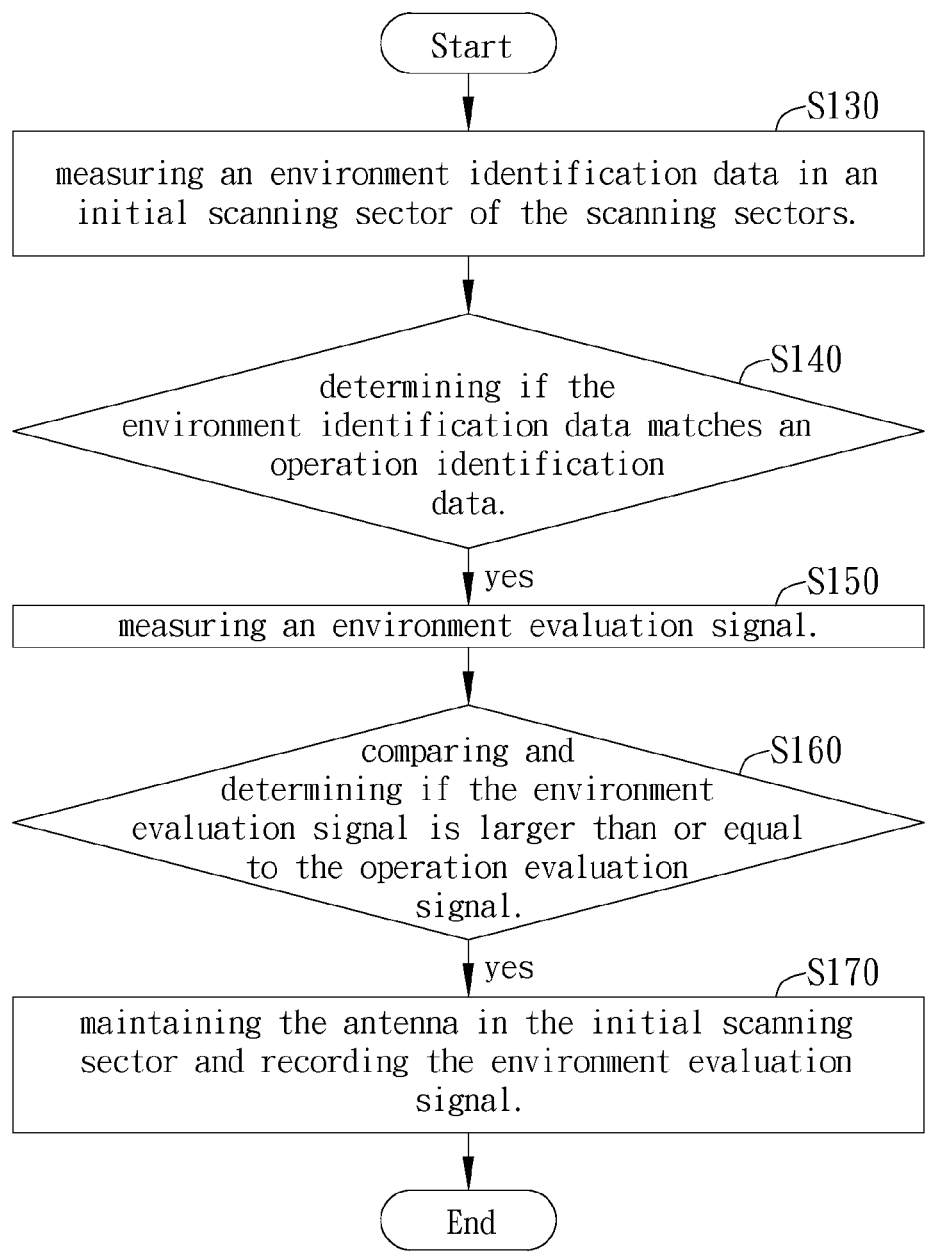
FIG. 1 is a flowchart of an embodiment of a control method of the present invention.

Please refer to FIG. 1; FIG. 1 is a flowchart of an embodiment of a control method of the present invention. As shown in FIG. 1, the method executes a step S130 including: measuring an environment identification data in an initial scanning sector of the scanning sectors; a step S140 including: determining if the environment identification data matches an operation identification data; a step S150 including: measuring an environment evaluation signal. It is noted that the environment evaluation signal corresponds to the environment identification data. In addition, the control method further executes a step S160 including: comparing and determining if the environment evaluation signal is larger than or equal to the operation evaluation signal; and a step S170 including: maintaining the antenna in the initial scanning sector and recording the environment evaluation signal. In the embodiment, the method confirms the orientation of the antenna by sequentially measuring and determining the identification data and measuring and comparing the evaluation data.

Figure 2:
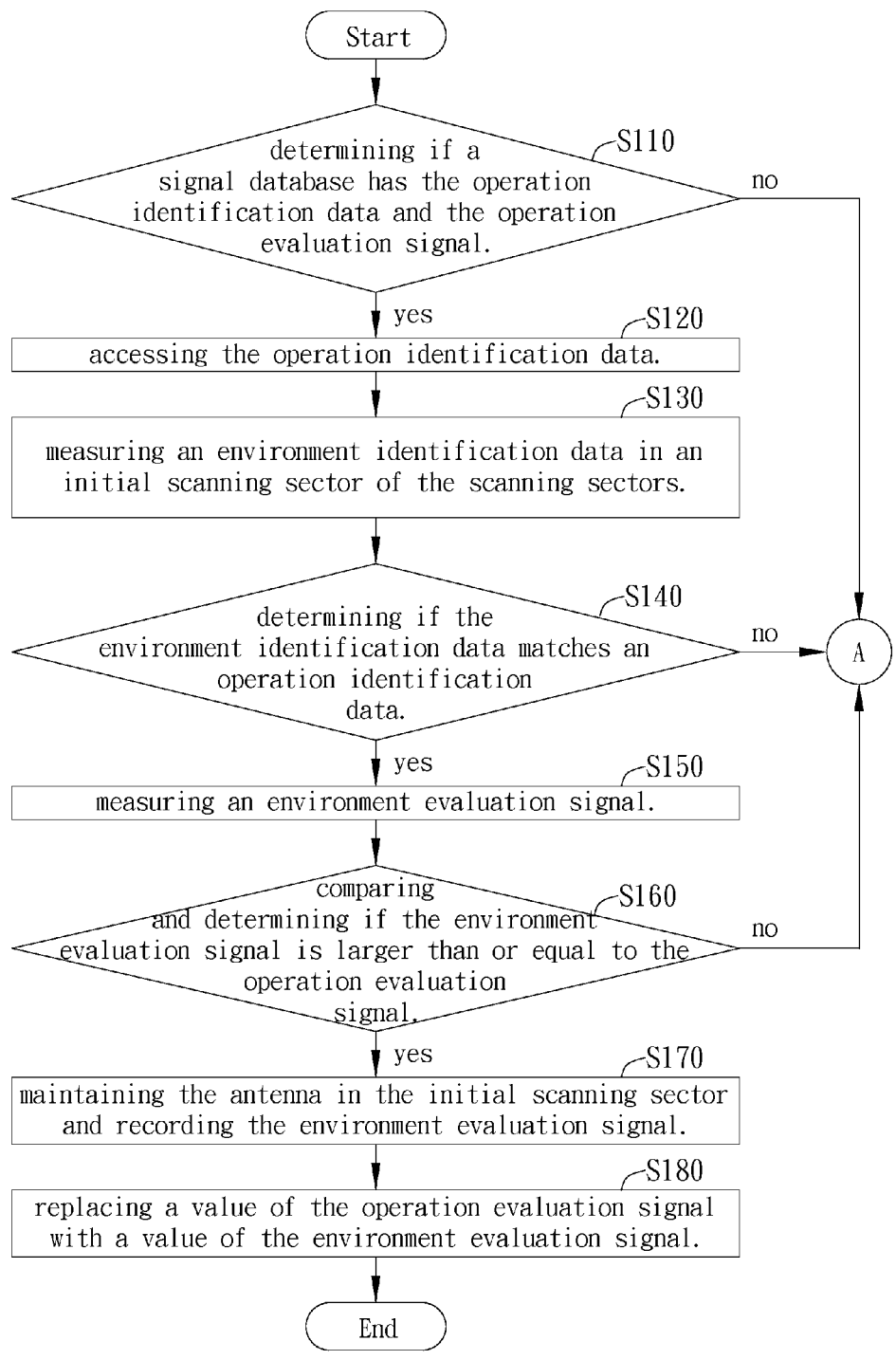
FIG. 2 is a flowchart of another embodiment of the control method of the present invention.

In addition, the present invention utilizes the embodiment of FIG. 2 to further illustrate the technique features and practical effect.

Figure 3:
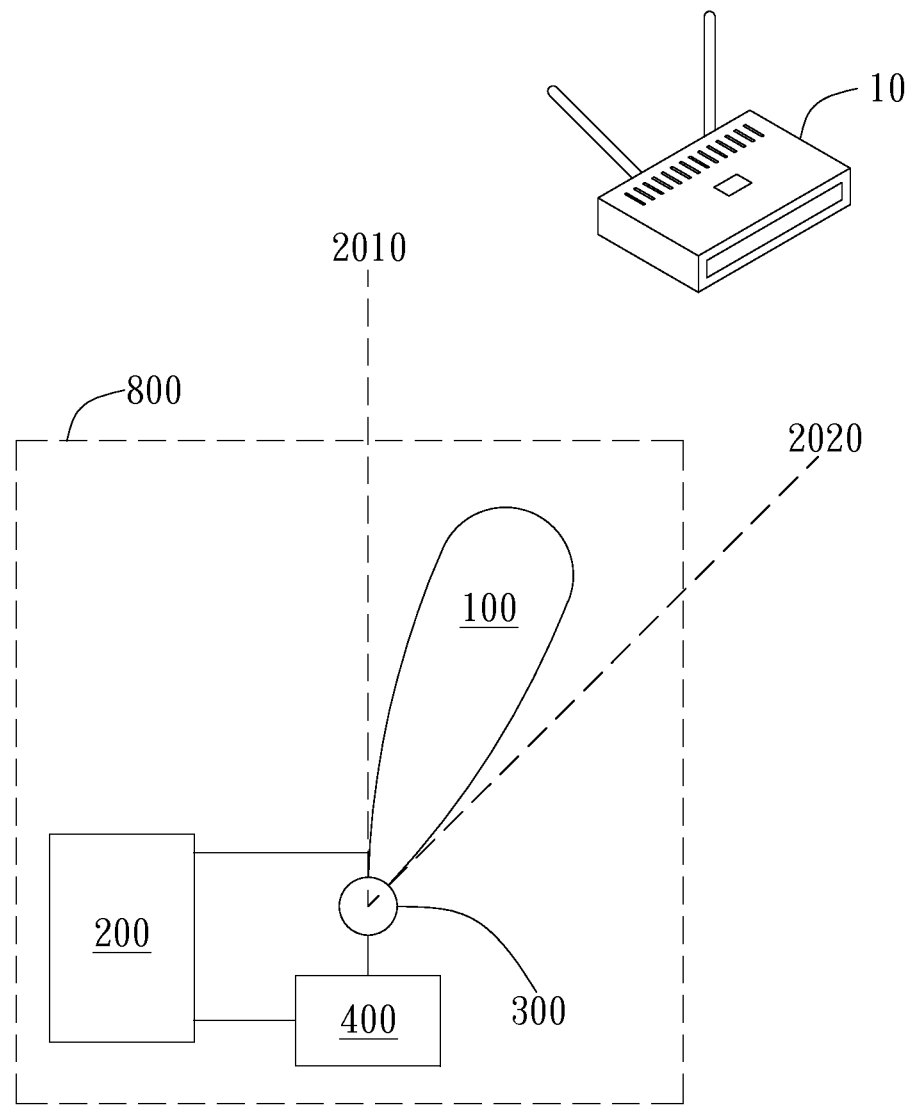
FIG. 3 is a schematic view of an embodiment of an antenna device of the present invention.

Please refer to FIG. 2; FIG. 2 is a flowchart of another embodiment of the method of the present invention. As shown in FIG. 2, the method firstly executes a step S110 including: determining if a signal database has the operation identification data and the operation evaluation signal. For instance, FIG. 3 is a schematic view of an embodiment of an antenna device of the present invention. As shown in FIG. 3, an antenna device 800 includes an antenna 100, a signal database 200, a rotation module 300, and a comparison module 400, wherein the comparison module 400 is connected with the signal database 200, and the antenna 100 is connected with the signal database 200. It is noted that the antenna device 800 is an embodiment to which the control method can be applied. The method can be applied to not only the antenna device 800 of the embodiment but also other types of rotatable antenna devices. In other embodiments, the antenna device has a plurality of antennas, and the antenna device utilizes the antennas to measure in multi-angular diversity. In addition, the antenna device 800 can be a wireless communication station device, but not limited to the embodiment.

In addition, the signal database 200 stores the operation identification data and the operation evaluation signal, wherein the operation identification data corresponds to the operation evaluation signal. It is noted that the operation identification data and the operation evaluation signal can be the data measured by the antenna device 800 initially or lately. In other words, when the antenna device 800 is initially activated, the signal database of the antenna device 800 may not have any data and needs to retrieve the identification data and the evaluation signals of the electronic devices located in the signal area by means of the antenna 100 measuring in the signal area. In practical applications, the operation identification data is the identification information of the device and can be a cell ID (identification), but not limited to the embodiment.

In practical applications, the operation evaluation signal is at least one of a reference signal receiving power (RSRP), a reference signal receiving quality (RSRQ), a signal to interference plus noise ratio (SINR), or a receiving signal strength indication (RSSI).

In addition, if the signal database 200 has the operation identification data and the operation evaluation signal, the method executes a step S120 including: accessing the operation identification data. For instance, the antenna device 800 accesses the operation identification data stored in the signal database 200. In practical applications, the operation identification data and the operation evaluation signal correspond to a specific device, and the antenna device 800 utilizes the signal database 200 to store the data of the specific device.

As shown in FIG. 2, the method executes the step S130 including: measuring an environment identification data in an initial scanning sector of the scanning sectors. For instance, as shown in FIG. 3, the antenna device 800 utilizes the antenna 100 to measure the environment identification data. It is noted that the environment identification data can be the identification data of the electronic device 10 in the signal area. In the embodiment, the electronic device 10 is located within the signal area between an extension line 2010 and an extension line 2020, wherein the area between the extension line 2010 and the extension line 2020 is defined as one of the scanning sectors, i.e. the initial scanning sector in this case. In other words, the areas between other extension lines are respectively other scanning sectors, and the antenna device 800 can define a plurality of scanning sectors in the signal area.

In practical applications, the electronic device 10 is located in the initial scanning sector between the extension line 2010 and the extension line 2020. It is noted that the angle between the extension line 2010 and the extension line 2020 is 45 degrees, but not limited thereto. In other words, each scanning sector has the angle of 45 degrees in the signal area. Furthermore, according to practical requirements, the method can define the angle of each scanning sector as 5 degrees, 10 degrees, 15 degrees, or 30 degrees, but not limited thereto. In other embodiments, the method further defines the scanning sector as a specific angle spread from a baseline, wherein the specific angle can be initiated from 1 degree and be increased progressively from 1 degree to 360 degrees.

In the embodiment, the environment identification data is the cell ID; the environment identification data and the operation identification data belong to the same type of data. The antenna device 800 utilizes the antenna 100 to measure the environment identification data of the electronic device 10 to retrieve the identification information of the electronic device 10.

In addition, the method executes the step S140 including: determining if the environment identification data matches an operation identification data. As shown in FIG. 3, the comparison module 400 determines if the environment identification data matches the operation identification data. In other words, the antenna device 800 utilizes the comparison module 400 to confirm if the environment identification data and the operation identification data are the same identification data. In practical applications, the comparison module 400 compares the environment identification data with the operation identification data to determine if the antenna device 800 has the identification data and the signal data of the electronic device 10.

If the environment identification data matches the operation identification data, the method confirms that the antenna device 800 has the identification data and the signal data of the electronic device 10. In addition, the method executes the step S150 including: measuring an environment evaluation signal. It is noted that the environment evaluation signal corresponds to the environment identification data. Furthermore, the electronic device 10 has the environment identification data, and the antenna device 800 requires measuring the environment evaluation signal of the electronic device 10. In the embodiment, the antenna 100 measures the environment evaluation signal, wherein the environment evaluation signal corresponds to the environment identification data. It is noted that the antenna 100 is located at the original scanning sector (which is the initial scanning sector between the extension line 2010 and the extension line 2020) and measures the environment evaluation signal of the electronic device 10, rather than rotating the antenna 100 for a full-angular measurement.

In addition, the environment evaluation signal is at least one of the reference signal receiving power (RSRP), the reference signal receiving quality (RSRQ), the signal to interference plus noise ratio (SINR), or the receiving signal strength indication (RSSI).

In addition, the method executes the step S160 including: comparing and determining if the environment evaluation signal is larger than or equal to the operation evaluation signal. It is noted that the operation identification data corresponds to the operation evaluation signal, and the step S160 determines whether to rotate the antenna by comparing the environment evaluation signal with the operation evaluation signal. For instance, the operation evaluation signal is stored in the signal database 200 of the antenna device 800, and the signal database 200 transmits the operation evaluation signal to the comparison module 400. In addition, the comparison module 400 compares the operation evaluation signal with the environment evaluation signal, wherein the type of the operation evaluation signal and the environment evaluation signal is the same. In other words, the operation evaluation signal and the environment signal can both be the reference signal receiving power to facilitate the comparison conducted by the comparison module 400. Furthermore, the antenna device 800 utilizes the comparison module 400 to compare the operation evaluation signal with the environment evaluation signal to determine whether the present scanning sector where the antenna 100 is located has excellent communication effect.

In other embodiments, the method can choose several types of evaluation signals to conduct the comparison. It is noted that the priority of determining the evaluation signals based on the types can be: the reference signal receiving power, the reference signal receiving quality, the signal to interference plus noise ratio, and the receiving signal strength indication, but not limited to the embodiment. In practical applications, the method can selectively compare the reference signal receiving power with the receiving signal strength indication. In the case that the reference signal receiving power of the environment evaluation signal is larger than the reference signal receiving power of the operation evaluation signal, and the receiving signal strength indication of the environment evaluation signal is smaller than the receiving signal strength indication of the operation evaluation signal, the method determines that the environment evaluation signal is larger than the operation evaluation signal since the reference signal receiving power has a higher priority than the receiving signal strength indication.

As shown in FIG. 2, if the environment evaluation signal is larger than or equal to the operation evaluation signal, the method executes the step S170 including: maintaining the antenna in the initial scanning sector and recording the environment evaluation signal. For instance, as shown in FIG. 3, if the environment evaluation signal is larger than or equal to the operation evaluation signal, it indicates that the antenna 100 can obtain excellent communication effect in the present scanning sector (which is the initial scanning sector) and is not necessarily to be rotated. Therefore, the antenna 100 can be maintained in the present scanning sector (i.e. the initial scanning sector). In addition, the signal database 200 records and stores the environment evaluation signal.

For instance, as shown in FIG. 3, the antenna 100 measures 20 environment evaluation signals which are respectively −110、−112、−111、−112、−112、−111、−112、−112、−113、−113、−114、−113、−115、−116、−115、−111、−111、−111、−160、−110 (dB), and the comparison module 400 computes the average and the standard deviation of the environment evaluation signals to generate −114.7 dB and 10.8 dB respectively. In practical applications, the comparison module 400 prioritizes to remove the environment evaluation signals that are larger than the sum of the average and the standard deviation, wherein the sum is −125.8 dB, so that the value, 160 dB, is removed. In addition, the comparison module 400 re-computes the average of the rest environment evaluation signals and obtains the result of −112.3 dB. If −112.3 dB is larger than or equal to the operation evaluation signal, the rotation module 300 maintains the antenna 100 in the initial scanning sector, and the signal database 200 records the environment evaluation signal as −112.3 dB.

As shown in FIG. 2, the method further executes a step S180 including: replacing a value of the operation evaluation signal with a value of the environment evaluation signal. Particularly, because the environment evaluation signal is not less than the operation evaluation signal, the environment evaluation signal is likely larger than or equal to the operation evaluation signal, and the signal database 200 stores the environment evaluation signal to replace the operation evaluation signal so as to ensure the update rate of the data. For example, if the operation evaluation signal is −70 dB, the environment evaluation signal is −69 dB, wherein the environment evaluation signal is larger than the operation evaluation signal. The signal database 200 replaces the operation evaluation signal with the environment evaluation signal, so that the new evaluation signal is −69 dB. It is noted that, when the signal database 200 has enough storage space, updating the operation evaluation signal is performed by the method of "storing". However, when the signal database 200 does not have enough storage space, updating the operation evaluation signal is conducted by the method of "replacing". In practical applications, the oldest operation evaluation signal (and the data stored at an earlier time) is prioritized to be replaced in the signal database.

Furthermore, the method of the present invention utilizes the signal database 200 to store the operation identification data and the operation evaluation signal and utilizes the comparison module 400 to compare the operation identification data with the environment identification data so as to identify the electronic device 10. In addition, the method further compares the operation evaluation signal with the environment evaluation signal to determine whether to rotate the antenna 100. In other words, the antenna device 800 can determine whether to rotate the antenna 100 by firstly executing the control method to compare the identification data with the evaluation signal. In practical applications, the electronic device 10 can be a base station, and the method can avoid frequently rotating the antenna and decrease the rotation frequency of the antenna 100 so as to extend the service life of the antenna device 800.

In addition, in other embodiments, the method further includes repeating the steps on a regular basis. For instance, the method can execute at least one of the steps of measuring the environment identification data and comparing regularly the data on a regular basis. In the embodiment, the method can periodically check if the current scanning sector is the scanning sector having optimum communication effect so as to determine whether to rotate the antenna.

Figure 4:
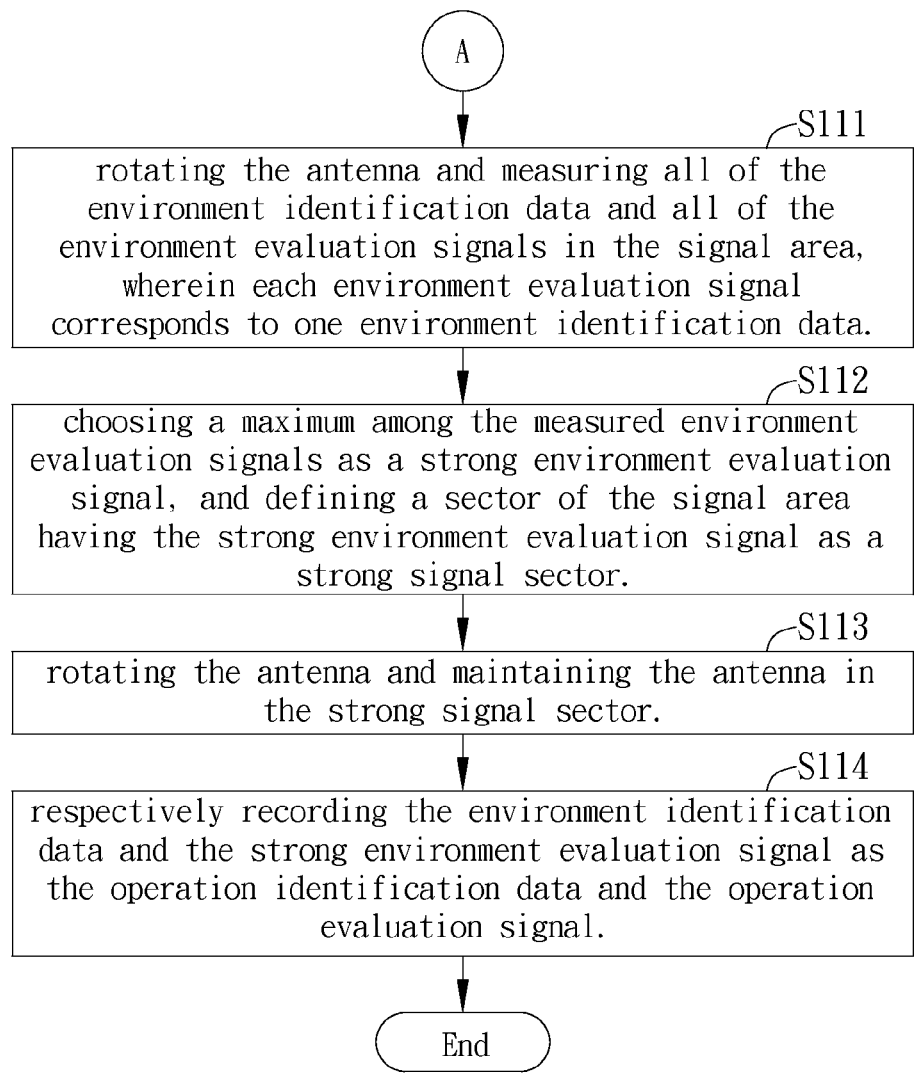
FIG. 4 is a flowchart of another embodiment of the control method of the present invention.

In addition, please refer to FIG. 4; FIG. 4 is a flowchart of another embodiment of the method of the present invention. As shown in FIGS. 2 and 4, if the method, in the step S110, confirms that the signal database does not have the operation identification data and the operation evaluation signal, the method executes a step S111 including: rotating the antenna and measuring all of the environment identification data and all of the environment evaluation signals in the signal area, wherein each environment evaluation signal corresponds to one environment identification data. For instance, as shown in FIG. 3, the rotation module 300 is connected with the antenna 100 and drives the antenna 100 to rotate in the signal area. In practical applications, the rotation module 300 can be a mechanical motor, an electric motor, a stepper motor, or other motors and, not limited to the embodiment. In the embodiment, the rotation module 300 is the stepper motor and can be driven to rotate with 2040 steps in the 360 degrees full-angular area. As shown in FIG. 3, the antenna device 800 can utilize the antenna 100 to measure the environment identification data to determine the device identification number of the electronic device 10.

In addition, in practical applications, the antenna 100 measures all of the environment identification data and all of the environment evaluation signals in the signal area, wherein all of the environment identification data include the environment identification data of the step S130, all of the environment evaluation signals include the environment evaluation signals of the step S150. Furthermore, the antenna 100 utilizes the steps S111 through S114 to execute the full-angular measurement.

In addition, the method executes a step S112 including: choosing a maximum among the measured environment evaluation signals as a strong environment evaluation signal, and defining a sector of the signal area having the strong environment evaluation signal as a strong signal sector. For instance, as shown in FIG. 3, after the antenna 100 measures all of the environment evaluation signals, if the environment evaluation signal measured in the scanning sector between the extension line 2010 and the extension line 2020 by the antenna 100 has the maximum, the method chooses the environment evaluation signal having the maximum as the strong environment evaluation signal and defines the scanning sector of the signal area having the strong environment evaluation signal as the strong signal sector. In other words, the antenna device 800 chooses the scanning sector between the extension line 2010 and the extension line 2020 as the strong signal sector.

In practical applications, the method further executes a step S113 including: rotating the antenna and maintaining the antenna in the strong signal sector. For instance, as shown in FIG. 3, the rotation module 300 rotates the antenna 100 and maintains the antenna 100 in the strong signal sector. In the embodiment, the strong signal sector is the scanning sector between the extension line 2010 and the extension line 2020.

In addition, the method further executes a step S114 including: respectively recording the environment identification data and the strong environment evaluation signal as the operation identification data and the operation evaluation signal. For instance, the signal database 200 can respectively record the environment identification data and the environment evaluation signal as the operation identification data and the operation evaluation signal.

In addition, as shown in FIGS. 2 and 4, if the method, in the step S140, determines the environment identification data does not match the operation identification data, the method will execute the step S111 including: rotating the antenna and measuring all of the environment identification data and all of the environment evaluation signals in the signal area, wherein each environment identification data corresponds to one environment identification data. For instance, the comparison module 400 determines that the environment identification data does not match the operation identification data and further determines that at least one electronic device exists in the signal area, and the signal database does not store the identification data of the at least one electronic device.

In addition, one or more electronic devices may exist in the signal area, and the antenna device 800 has to re-measure to obtain and store the identification data and the evaluation signal. In practical applications, the antenna device 800 drives the antenna 100 to rotate and execute the full-angular measurement. It is noted that if several electronic devices exist in the signal area, the method, according to the step S112, chooses the maximum among the measured environment evaluation signals as a strong environment evaluation signal and, according to the step S113, rotates the antenna 100 to the strong signal sector. In addition, the method, in the step S114, records the environment identification data that corresponds to the strong environment evaluation signal as the operation identification data. The detailed descriptions of the steps S111 through S114 is provided above and not elaborated hereinafter.

In addition, as shown in FIGS. 2 and 4, if the method, in the step S160, confirms that the environment evaluation signal is smaller than the operation evaluation signal, the method will execute the steps S111 through S114. For instance, the comparison module 400 determines that the environment evaluation signal is smaller than the operation evaluation signal and further determines that the scanning sector where the antenna 100 points to does not have optimum communication effect, so that it is necessary to execute the full-angular measurement. The detailed descriptions of the steps is provided above and not elaborated hereinafter.

Compared to the prior arts, the antenna device and the control method thereof of the present invention determine whether to rotate the antenna by comparing the environment evaluation signal and the operation evaluation signal so as to decrease the frequency of rotating the antenna. In practical applications, the antenna device and the method thereof maintain the antenna in the initial scanning sector if the environment evaluation signal is larger than or equal to the operation evaluation signal. In other words, the antenna device and the method thereof utilize a mechanism of driving judgment to increase the service life.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method for controlling an antenna, the antenna capable of rotating in a signal area and pointing to one of a plurality of scanning sectors of the signal area, the method comprising:
   (a) measuring an environment identification data in an initial scanning sector of the scanning sectors and determining when the environment identification data matches an operation identification data;
   (b) when the environment identification data matches the operation identification data, measuring an environment evaluation signal, wherein the environment evaluation signal corresponds to the environment identification data;

(c) comparing the environment evaluation signal with an operation evaluation signal, wherein the operation identification data corresponds to the operation evaluation signal; and (d) maintaining the antenna in the initial scanning sector and recording the environment evaluation signal when the environment evaluation signal is larger than or equal to the operation evaluation signal.

2. The method of claim 1, before the step (a), further comprising:
- (a1) determining when a signal database has the operation identification data and the operation evaluation signal; and
- (a2) accessing the operation identification data when the signal database has the operation identification data and the operation evaluation signal.

3. The method of claim 2, after the step (a1), further comprising:
- rotating the antenna and measuring all of the environment identification data and all of the environment evaluation signals in the signal area when the signal database does not have the operation identification data and the operation evaluation signal, wherein each environment evaluation signal corresponds to one environment identification data;
- choosing a maximum among the measured environment evaluation signals as a strong environment evaluation signal, and defining a scanning sector of the signal area having the strong environment evaluation signal as a strong signal sector;
- rotating the antenna and maintaining the antenna in the strong signal sector; and
- respectively recording the environment identification data and the strong environment evaluation signal as the operation identification data and the operation evaluation signal.

4. The method of claim 1, after the step (a), further comprising:
- rotating the antenna and measuring all of the environment identification data and all of the environment evaluation signals in the signal area when the environment identification data does not match the operation identification data, wherein each environment evaluation signal corresponds to one environment identification data;
- choosing a maximum among the measured environment evaluation signals as a strong environment evaluation signal, and defining a scanning sector of the signal area having the strong environment evaluation signal as a strong signal sector;
- rotating the antenna and maintaining the antenna in the strong signal sector; and
- respectively recording the environment identification data and the strong environment evaluation signal as the operation identification data and the operation evaluation signal.

5. The method of claim 1, after the step (c), further comprising:
- rotating the antenna and measuring all of the environment identification data and all of the environment evaluation signals in the signal area when the environment evaluation signal is smaller than the operation identification signal, wherein each environment evaluation signal corresponds to one environment identification data;
- choosing a maximum among the measured environment evaluation signals as a strong environment evaluation signal, and defining a scanning sector of the signal area having the strong environment evaluation signal as a strong signal sector;
- rotating the antenna and maintaining the antenna in the strong signal sector; and
- respectively recording the environment identification data and the strong environment evaluation signal as the operation identification data and the operation evaluation signal.

6. The method of claim 1, the step (d) further comprising:
- replacing a value of the operation evaluation signal with a value of the environment evaluation signal.

7. The method of claim 1, wherein the operation evaluation signal and the environment evaluation signal are at least one of a reference signal receiving power (RSRP), a reference signal receiving quality (RSRQ), a signal to interference plus noise ratio (SINR), or a receiving signal strength indication (RSSI).

8. The method of claim 1, wherein the signal area comprises a 360 degrees full-angular area of a plane.

9. A communication device disposed in a signal area, comprising:
- a signal database storing an operation evaluation data and an operation evaluation signal, wherein an operation identification data corresponds to the operation evaluation signal;
- an antenna connected with the signal database, wherein the antenna is located in one of a plurality of scanning sectors and measures an environment identification data and an environment evaluation signal in an initial scanning sector of the scanning sectors, and the environment identification data corresponds to the environment evaluation signal; and
- a comparison module connected with the signal database, the comparison module determining whether the environment identification data matches the operation identification data, wherein when the environment identification data matches the operation identification data, the comparison module compares the operation evaluation signal with the environment evaluation signal; when the environment evaluation signal is larger than or equal to the operation evaluation signal, the antenna is maintained in the initial scanning sector and the signal database records the environment evaluation signal.

10. The communication device of claim 9, further comprising:
- a rotation module connected with the antenna, the rotation module driving the antenna to rotate in the signal area.

* * * * *